D. B. NEAL.

Rotary Harrow.

No. 21,269.

Patented Aug. 24. 1858.

UNITED STATES PATENT OFFICE.

DANIEL B. NEAL, OF MOUNT GILEAD, OHIO.

IMPROVEMENT IN HARROWS.

Specification forming part of Letters Patent No. 21,269, dated August 24, 1858.

*To all whom it may concern:*

Be it known that I, DANIEL B. NEAL, of Mount Gilead, in the county of Morrow and State of Ohio, have invented certain new and useful Improvements in Revolving Harrows; and I do hereby declare that the following is a full, clear, and exact description of the same, reference being had to the accompanying drawings, and to the letters of reference marked thereon.

The nature of my invention consists in the arrangement of the troughs and balls with the frame of the harrow in the manner that will be hereinafter described.

In order that those skilled in the arts may make and use my invention, I will proceed to describe its construction and operation.

Figure 1:
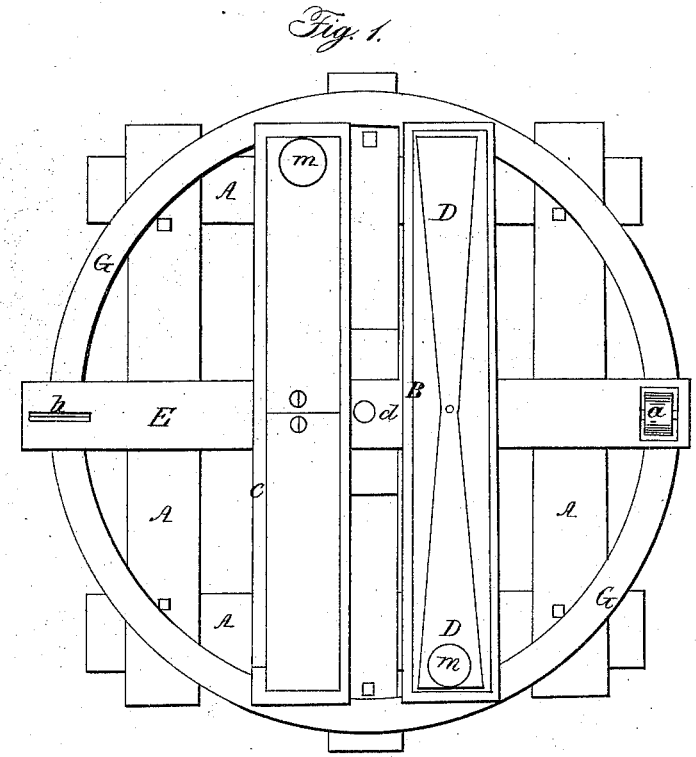
Figure 2:
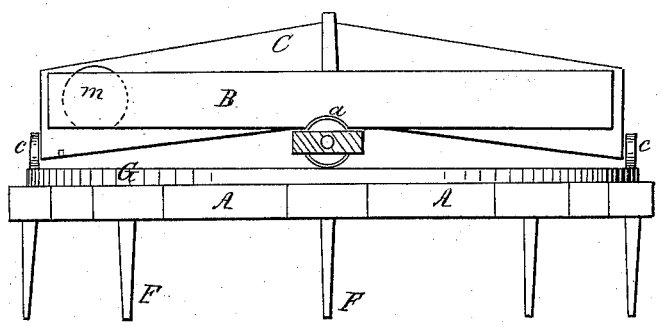
Figure 3:
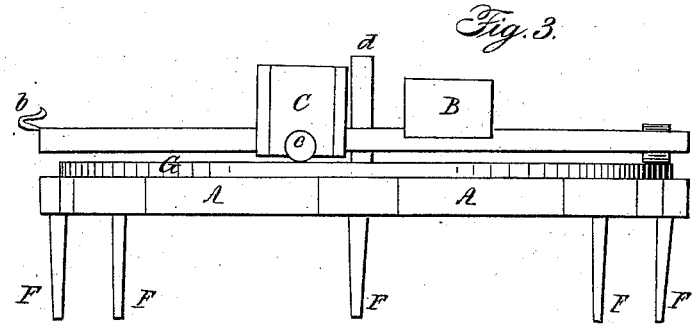

In the annexed drawings, Figure 1 is a plan view. Fig. 2 is a side elevation showing the sides of the troughs. Fig. 3 is a side elevation showing the ends of the troughs.

In the several figures, A represents the frame of the harrow, which is square, as seen, and provided with the teeth F F F on its under side. On the top of this frame will be seen a circular track or road, (marked G,) on which the rollers *a* and *c c* travel.

E is a beam which crosses the frame A, and is connected to it by means of a rod, *d*, which stands in a perpendicular position on said frame at its center and passes through the center of said beam E. This beam is provided with a hook, *b*, at one end and with a friction-roller, *a*, at its other. It turns around the rod *d*, or when in use the harrow may revolve, the beam standing in one position; but in either instance the roller *a* runs around the track G and prevents any friction upon said track.

B and C are two troughs secured to the beam E, C being permanent, and B, hung on a pivot, oscillates backward and forward when necessary, and is adjustable to accommodate itself to the different positions in which the harrow may be placed.

D D are two springs, secured in the trough B. *m m* are weights in the form of balls, which are placed loose in the two troughs B and C. These weights change sides when the harrow is on hillside or uneven ground, passing to the lower side. *c c* are friction-rollers, secured to the ends of the stationary trough C, which pass around on the track when the harrow is in motion and assist in preventing friction.

In the operation of this machine the power is attached to the front of the beam, to the hook *b*, and the harrow is set in motion. When the harrow in its course strikes a firm obstacle with one side it revolves, and thus frees it and passes on. On level ground the harrow will always, when striking such an obstacle, revolve and free itself; but when on hillside or uneven ground it will not revolve successfully when striking an obstacle, unless the lower part of the harrow is heavier than the upper part. I provide the troughs as described, so that when on even ground the weights may equalize each other; but when on uneven they may of their own accord change to the lower side, and thus the harrow will work freely without the trouble of changing the weights at each change of ground.

Having thus fully described my invention, what I claim as new, and desire to secure by Letters Patent, is—

The arrangement of the troughs B and C (the one oscillating and adjustable, the other being stationary, and both provided with balls) with a revolving harrow, as described, substantially in the manner and for the purpose set forth.

DANIEL B. NEAL.

Witnesses:
T. H. DALRYMPLE.
M. B. TALMAGE.